US008236214B2

(12) United States Patent
Kwiecien

(10) Patent No.: US 8,236,214 B2

(45) Date of Patent: Aug. 7, 2012

(54) WET SHAVING SYSTEM INCLUDING A MINERAL OIL COATED SHAVING AID

(75) Inventor: Michael J. Kwiecien, Scituate, MA (US)

(73) Assignee: The Gillette Company, Boston, MA (US)

(*) Notice: Subject to any disclaimer, the term of this patent is extended or adjusted under 35 U.S.C. 154(b) by 0 days.

(21) Appl. No.: 12/778,816

(22) Filed: May 12, 2010

(65) Prior Publication Data

US 2010/0218379 A1 Sep. 2, 2010

Related U.S. Application Data

(63) Continuation of application No. 11/520,388, filed on Sep. 13, 2006, now abandoned.

(51) Int. Cl.

*B32B 25/00* (2006.01)
*B29C 47/00* (2006.01)
*B29C 45/00* (2006.01)
*B05D 7/00* (2006.01)
*B26B 21/00* (2006.01)
*B26B 21/40* (2006.01)

(52) U.S. Cl. ................ 264/134; 264/171.1; 264/173.16; 264/173.18; 264/211; 264/241; 264/259; 264/328.1; 30/32; 30/537; 30/538; 424/73; 427/2.14; 427/2.21; 427/2.3; 427/2.31; 427/212; 427/222

(58) Field of Classification Search ........................ None
See application file for complete search history.

(56) References Cited

U.S. PATENT DOCUMENTS

| | | | | |
|---|---|---|---|---|
| 4,220,463 | A * | 9/1980 | Van Hijfte et al. | 71/27 |
| 4,396,522 | A * | 8/1983 | Callicott et al. | 510/193 |
| 4,636,543 | A | 1/1987 | Helton | |
| 4,872,263 | A | 10/1989 | Etheredge | |
| 4,963,351 | A | 10/1990 | Weston | |
| 5,113,585 | A | 5/1992 | Rogers et al. | |
| 5,186,972 | A * | 2/1993 | Williams et al. | 427/2.28 |
| 5,279,819 | A | 1/1994 | Hayes | |
| 5,431,906 | A | 7/1995 | Mohseni et al. | |
| 5,626,154 | A | 5/1997 | Rogers et al. | |
| 5,658,956 | A | 8/1997 | Martin et al. | |
| 5,692,302 | A | 12/1997 | Martin et al. | |
| 5,956,848 | A | 9/1999 | Tseng et al. | |
| 6,149,981 | A | 11/2000 | Chadwick et al. | |
| 6,182,365 | B1 | 2/2001 | Tseng et al. | |
| 6,185,822 | B1 | 2/2001 | Tseng et al. | |
| 6,298,559 | B1 | 10/2001 | Kwiecien et al. | |
| 6,442,839 | B1 | 9/2002 | Tseng et al. | |
| 6,594,904 | B1 | 7/2003 | Tseng | |
| 6,825,273 | B2 | 11/2004 | Duan et al. | |
| 2003/0046819 | A1* | 3/2003 | Ferraro et al. | 30/527 |
| 2003/0053980 | A1 | 3/2003 | Dodd et al. | |
| 2004/0181943 | A1* | 9/2004 | Kwiecien | 30/41 |
| 2005/0175575 | A1 | 8/2005 | Xu et al. | |
| 2006/0110415 | A1 | 5/2006 | Gupta | |
| 2006/0127344 | A1 | 6/2006 | Zofchak et al. | |
| 2006/0135627 | A1 | 6/2006 | Frantz et al. | |
| 2006/0225285 | A1* | 10/2006 | Slavtcheff et al. | 30/41 |
| 2006/0272155 | A1 | 12/2006 | Mehta et al. | |

* cited by examiner

*Primary Examiner* — Jeffrey Wollschlager

(74) *Attorney, Agent, or Firm* — Ronald T. Sia; Kevin C. Johnson; Steve W. Miller

(57) ABSTRACT

A wet shaving system is disclosed including a blade member and a skin-engaging portion in proximity to said blade member, the skin-engaging portion comprising a solid polymeric shaving aid composite including an exposed portion containing a water-soluble shaving aid dispersed in a water-insoluble polymeric matrix, the water soluble shaving aid being coated with mineral oil.

6 Claims, 2 Drawing Sheets

WET SHAVING SYSTEM INCLUDING A MINERAL OIL COATED SHAVING AID

CROSS REFERENCE TO RELATED APPLICATION

This application is a Continuation of U.S. application Ser. No. 11/520,388, filed on Sep. 13, 2006, now abandoned.

FIELD OF THE INVENTION

This invention relates to skin engaging members for wet shaving systems.

BACKGROUND OF THE INVENTION

In wet shaving systems, factors such as the frictional drag of the razor across the skin, the force needed to sever hairs, and irritation of pre-existing skin damage can create a degree of shaving discomfort. Discomfort, and other problems accompanying wet shaving systems, can be alleviated by the application of shaving aids to the skin. Shaving aids may be applied prior to, during, or after shaving. A number of problems accompany the use of pre- and post-applied shaving aids. Pre-applied-shaving aids can evaporate or can be carried away from the site of application by repeated strokes of the razor. Post-applied-shaving aids are not present on the skin during shaving and thus their application may be too late to prevent an unwanted affect. Both pre-applied and post-applied shaving aids add additional steps to the shaving process.

Shaving aids, e.g., a lubricant, whisker softener, razor cleanser, medicinal agent, cosmetic agent or combination thereof, have been incorporated into razors, for example by incorporating a shaving aid into one or more molded polymeric components of the razor. U.S. Pat. No. 5,113,585 to Rogers discloses a shaving aid composite that includes a water-soluble shaving aid, e.g. polyethylene oxide, dispersed within a water insoluble matrix material, e.g., a polystyrene polymer. Such shaving aid composites have been mounted on razor cartridge structure. Upon exposure to water, the water-soluble shaving aid leaches from the composite onto the skin and the composite tends to swell.

U.S. Pat. No. 6,442,839 mentions mineral oil as one of a number of shaving aids that may be included in the water insoluble matrix. Mineral oil has also been used as a plasticizer for the water insoluble material in shaving aid composites used on various commercially available razors. In these instances, the mineral oil is bound to the water insoluble material and does not leach out of the shaving aid composite during shaving. Mineral oil is mentioned in U.S. Pat. No. 6,182,365 as a plasticizer present in a particular thermoplastic elastomer that may be used in a skin engaging member for a razor.

Commercial products have been sold by The Gillette Company, more than one year prior to the filing date of the present application, in which the shaving aid composite included polyethylene oxide that had been spray coated with Vitamin E and botanical oils such as grapeseed and avocado oils.

SUMMARY OF THE INVENTION

The invention features a wet shaving system. The system includes a blade member that further comprises one or more blades and an external skin-engaging member in proximity to the blade member. The shaving system may be, for example, a disposable razor cartridge adapted for coupling to or uncoupling from a razor handle, or a shaving head which is integral with a razor handle so that the complete razor is discarded as a unit when the blade or blades become dulled. In the case where the system comprises a razor cartridge, the razor cartridge comprises the blade member. In the case where the system comprises a disposable shaving cartridge, the disposable shaving cartridge may likewise further comprise the blade member. The blade members in either case comprise blades that include one or more blade edges. The blade edges cooperate with the skin engaging portion to define shaving geometry.

The skin engaging member includes a solid, polymeric shaving aid composite that comprises a water-soluble shaving aid dispersed in a water-insoluble polymeric matrix. Importantly, the water soluble shaving aid is coated with mineral oil. Without wishing to be bound by any specific theory, it appears that the mineral oil coating on particles of the water-soluble shaving aid both (a) enhances glide during shaving, and (b) inhibits swelling of the shaving aid composite. It is currently believed that, because mineral oil is a non-polar, water-immiscible hydrocarbon, it is relatively non-susceptible to degradation (e.g., by oxidation) as a result of contact with water. As a result, mineral oil appears to provide a "water-proofing" effect, inhibiting water absorption of the shaving aid composite. Because swelling is inhibited, the shaving geometry of the shaving system is better maintained from shave to shave, helping to maintain shaving performance.

Shaving geometry is understood to include a measurement of the "exposure" of the rearwardmost blade edge nearest the cap, as known from the prior art, e.g., as disclosed in U.S. Pat. No. 6,212,777, the full disclosure of which is incorporated herein by reference. In some instances, the exposure of the rearward blade is determined relative to a fixed, rigid portion of the cartridge housing. In other instances, the exposure of the rearward blade is determined relative to a shaving aid strip surface (often referred to as a "lube strip") disposed in the cap region.

In one aspect, the disclosure features a wet shaving system including a blade member and a skin-engaging portion in proximity to said blade member, the skin-engaging portion comprising a solid polymeric shaving aid composite including an exposed portion containing a water soluble shaving aid dispersed in a water-insoluble polymeric matrix, at least a portion of the water soluble shaving aid being coated with mineral oil.

In some implementations, the blade member and skin-engaging portion are mounted on a housing of a razor cartridge. The skin-engaging portion may comprise an elongated strip, or may have any other desired geometry. The shaving aid composite may include a base layer and a surface layer, the surface layer having a relatively higher concentration of mineral oil than the base layer.

In another aspect, the disclosure features a method of manufacturing a shaving aid composite comprising: (a) coating a water-soluble shaving aid with mineral oil; (b) mixing the water-soluble shaving aid with a water-insoluble polymer; and (c) forming the mixture into a solid shaving aid composite shaped to be retained by a receiving portion of a razor cartridge.

The forming step may include forming a base layer having a first composition and a surface layer having a second composition, in which case, the second composition may, in some implementations, have a relatively higher concentration of mineral oil than the second composition.

In a further aspect, the disclosure features a wet shaving system comprising a blade member and a skin-engaging portion in proximity to said blade member, the skin-engaging portion comprising a solid polymeric shaving aid composite including an exposed portion containing a water soluble shaving aid dispersed in a water-insoluble polymeric matrix, the water soluble shaving aid comprising from about 2% to about 6% mineral oil based on the total weight of the water soluble shaving aid.

The disclosure also features a shaving aid composite that includes a water-insoluble polymeric matrix, and, dispersed within the water-insoluble polymeric matrix, a water soluble shaving aid. The water soluble shaving aid comprises a water-soluble polymer, at least a portion of the water-soluble polymer being coated with mineral oil.

The details of one or more embodiments of the invention are set forth in the accompanying drawings and the description below. Other features and advantages of the invention will be apparent from the description and drawings, and from the claims.

DETAILED DESCRIPTION OF THE INVENTION

Figure 1:
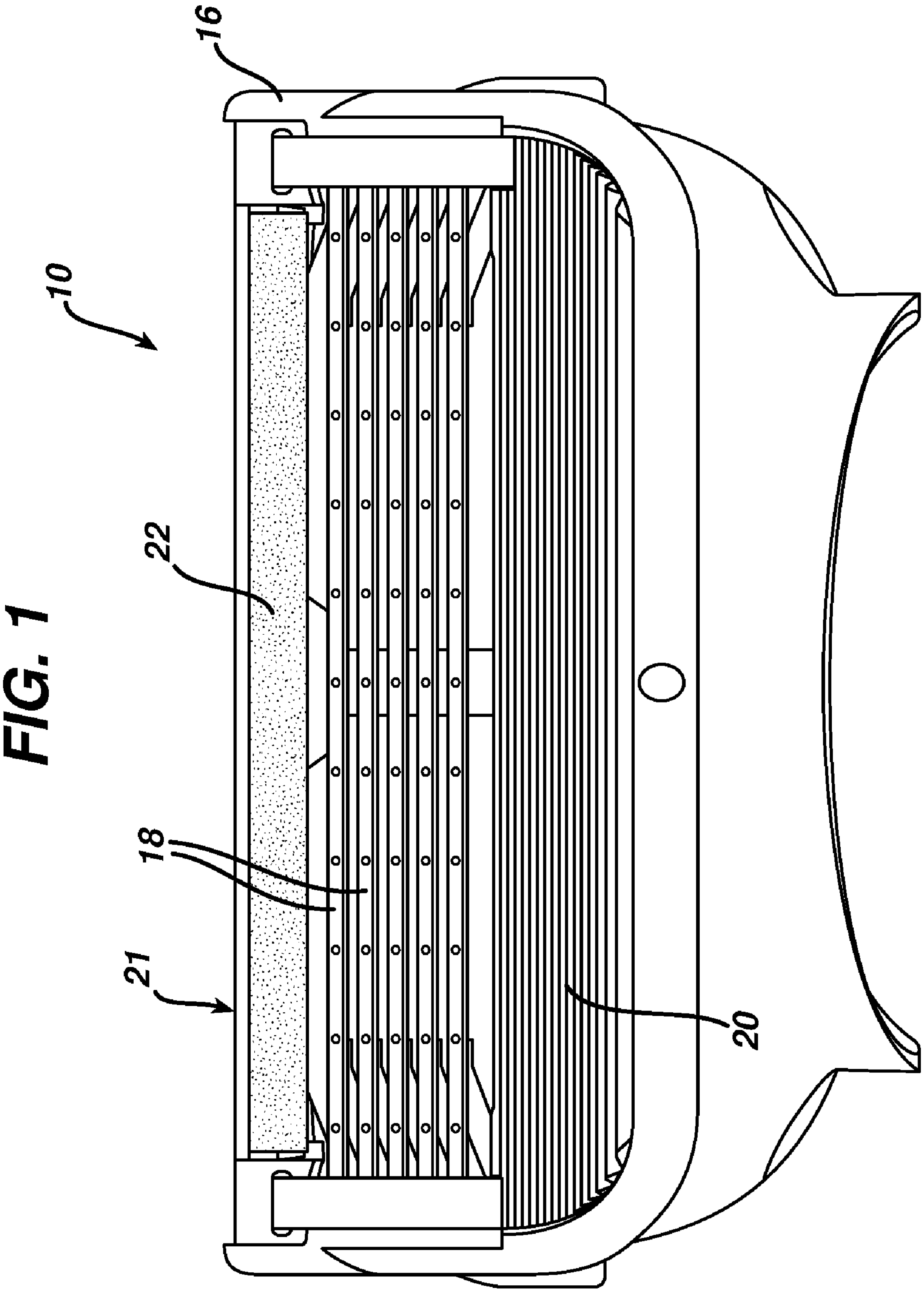
FIG. 1 is a front view of a shaving system in accordance with the invention.

The replaceable shaving system 10 shown in FIG. 1 includes a housing 16, which carries a plurality of blades 18, a guard 20, and a cap 21. A portion of the cap 21 includes a solid, polymeric shaving aid composite 22, which is in the form of an elongated insert member. The shaving aid composite 22 is locked in an opening in the rear of the shaving system and includes a shaving aid that is released during shaving to improve shave attributes. While shown at the rear portion (commonly referred to as the cap portion) of this particular shaving system, the shaving aid composite may be located at any skin-engaging portion of the shaving unit and may be fabricated in any size or shape deemed appropriate. For example, the composite can be incorporated into the shaving units described in U.S. Pat. No. 4,586,225, which is incorporated herein by reference.

Figure 2:
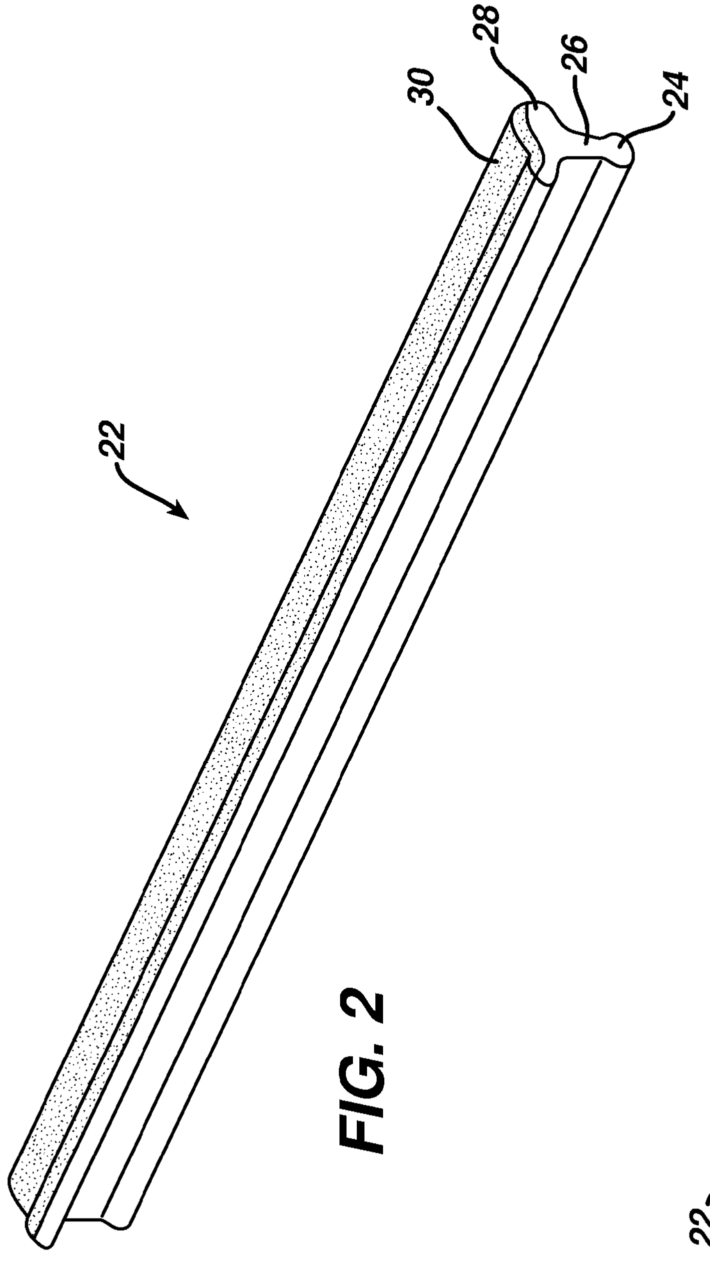
FIG. 2 is a perspective view of a shaving aid composite in accordance with the invention.
Figure 3:
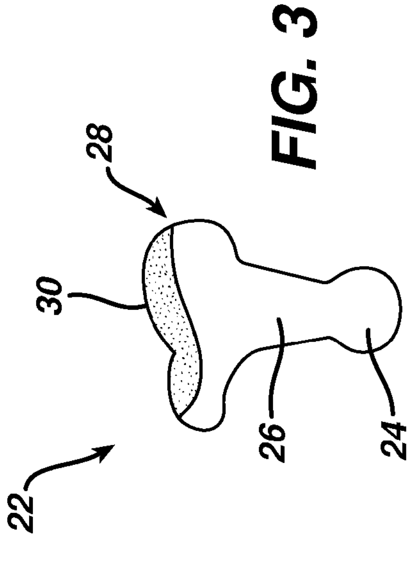
FIG. 3 is a side view of the composite in FIG. 2.

While the shaving aid composite may have any desired shape, one preferred shape is shown in FIGS. 2 and 3, in which shaving aid composite 22 includes lengthwise-extending base portions 24, which allows the shaving aid composite to be retained by the housing, a lengthwise extending connecting portion 26, and a lengthwise extending enlarged upper portion 28. Upper portion 28 includes a surface layer 30 which is exposed for skin engagement. Portions 24 and 26 have the same compositions and may be formed as a single, integral part if desired. The surface layer 30 of upper portion 28 may have a different composition, as shown in FIGS. 2 and 3, or may have the same composition. The surface layer may be, for example, a colored composition that wears away during shaving and acts as an indicator of system or cartridge wear.

The shaving aid composite 22 contains a water-soluble shaving aid and a water insoluble polymer and a shaving aid. The water-soluble shaving aid may be present only in the surface layer 30, or may be present in the entire upper portion 28, or the entire shaving aid composite. Different concentrations of the water-soluble shaving aid may be used in different portions of the shaving aid composite, e.g., a higher level may be used in surface layer 30 and a relatively lower level may be used in the rest of the shaving aid composite.

A water-soluble shaving aid is a substance that enhances shaving performance. It may, for example, improve shaving comfort (e.g., by lubricating the skin, improve shaving efficiency, condition the beard or other body hair, or condition the skin. Examples of shaving aids include lubricous water-soluble polymers such as polyethylene oxide, polyvinyl pyrrolidone, polyacrylamide, hydroxypropyl cellulose, polyvinyl imidazoline, and polyhydroxyethylmethacrylate.

At least a portion of the water-soluble shaving aid is coated, prior to incorporation into the shaving aid composite, with mineral oil. In some implementations, all of the water-soluble shaving aid is coated with mineral oil. In certain embodiments, the mineral oil is spray coated and such may be accomplished using conventional spray-coating process. In other embodiments, e.g., smaller scale production schemes, the mineral oil may be applied via an eye dropper while the water-soluble shaving aid is tumbled or agitated. The mineral oil may be included, for example, at a concentration of from about 0.5%, 1%, 1.5%, 2%, 3%, 3.5%, or 4% to about 4.5%, 6%, 7%, 8%, 8.5%, 9%, or 10%, based on the total weight of the water-soluble shaving aid.

Suitable water-insoluble polymers which can be used include polyethylene, polypropylene, polystyrene, butadiene-styrene copolymer (e.g. medium and high impact polystyrene), polyacetal, acrylonitrile-butadiene-styrene copolymer, ethylene vinyl acetate copolymer and blends such as polypropylene/polystyrene blend.

The preferred lubricous water-soluble polymer is polyethylene oxide. The more preferred polyethylene oxides generally are known as POLYOX (available from Union Carbide Corporation) or ALKOX (available from Meisei Chemical Works, Kyoto, Japan). These polyethylene oxides will preferably have molecular weights of about 100,000 to 6 million, most preferably about 300,000 to 5 million. The most preferred polyethylene oxide comprises a blend of about 40% to 80% of polyethylene oxide having an average molecular weight of about 5 million (e.g. POLYOX COAGULANT) and about 60% to 20% of polyethylene oxide having an average molecular weight of about 300,000 (e.g. POLYOX WSR-N-750). The polyethylene oxide blend may also advantageously contain up to about 10% by weight of a low molecular weight (i.e., MW<10,000) polyethylene glycol such as PEG-100. The polyethylene oxide may be provided, for example, in powder or pellet form.

Preferably, each portion includes about 5%, 15%, or 20% to about 35%, 40%, or 50% by weight of the water-insoluble polymer. The more preferred water-insoluble polymer is polystyrene, preferably a general purpose polystyrene such as BASF 2824 or a high impact polystyrene (i.e. polystyrene-butadiene), such as Mobil 4324. The portion should contain a sufficient quantity of water-insoluble polymer to provide adequate mechanical strength, both during production and use.

Enough shaving aid should be included to provide the desired benefit. A portion may contain, for example, about 20%, 30%, or 40% to about 75% or 80% by weight of a lubricous water soluble polymer. A portion also may include, for example, about 0.01% or 0.05% to about 1%, 1.5%, 2.5%, 5.0% vitamin E (or common forms of vitamin E) by weight.

The shaving aid may also contain other conventional shaving and composite ingredients, such as low molecular weight water-soluble release enhancing agents such as polyethylene glycol (e.g., 1-10% by weight), colorants, antioxidants and preservatives. Water-soluble release enhancing agents are described in U.S. Pat. No. 5,113,585, which is incorporated herein by reference. Portions that contain a colorant can be designed to release the colorant, and change color, during shaving, preferably in response to wear of the portion. A portion may contain, for example, between about 0.1%, 0.25%, or 0.5% and about 2%, 3%, or 5% colorant by weight.

The shaving aid composite 22 may be, for example, between about 30 mm, 31 mm, or 31.5 mm and about 32 mm, 32.5 mm, 33.5 mm, or 35 mm in length, and between about 1.5 mm or 1.75 mm and about 2 mm, 2.25 mm, 2.5 mm, or 3.0 mm in width at its widest portion (i.e., the widest portion of upper portion 28). The shaving aid composite may have an overall height, for example, of about 2 mm, 2.25, mm, 2.3 mm to about 2.3 mm, 2.35 mm, 2.45 mm, or 2.5 mm, measured along the longest distance between the bottom surface and top surface of the composite. When the shaving aid composite includes a surface layer 30, as shown in FIGS. 2-3, the surface layer may have a thickness, for example, of about 0.2 mm to about 0.25 mm, measured at the centerline of the composite.

The shaving aid composite may be fabricated by any appropriate method, including injection molding and extrusion, the latter being preferred. Any or all of the portions of the shaving aid composite may include the mineral oil coated water soluble shaving aid.

In some implementations, compositions for use in forming the shaving aid composite include (a) from about 5%, 15%, or 20% to about 35%, 40%, or 50% by weight of the water-insoluble polymer, (b) from about 20%, 30%, or 40% to about 75% or 80%, by weight of a lubricous water soluble polymer, and (c) about 0.5%, 2%, or 3.5% to about 4.5%, 6%, or 10% mineral oil, wherein the concentration of mineral oil is based on the total weight of the water-soluble shaving aid and the concentrations of the two polymers being based on the total weight of the composition. In some cases, the concentration of mineral oil based on the total weight of the composition (wt/wt basis) is in the range of about 0.1% to about 1.5%, e.g., about 0.12% to about 1.2%.

The shaving aid composites can be prepared by conventional coextrusion or molding methods known to those skilled in the art, as discussed in U.S. Pat. No. 5,956,848, the full disclosure of which is incorporated by reference herein. Once cooled, the composite can be cut to the appropriate length and attached to a razor cartridge or shaving system.

A number of embodiments of the invention have been described. Nevertheless, it will be understood that various modifications may be made without departing from the spirit and scope of the invention.

For example, the shaving aid composite may be attached to the housing in any desired manner. For instance, the shaving aid composite may be mounted on the housing an adhesive, rather than locking the shaving aid composite into an opening in the housing, as discussed above.

Moreover, the shaving aid composite may have any desired geometry and/or location. For example, the shaving aid composite may extend across the full width of a shaving system or razor cartridge, or only part of its width. Moreover, the composite need not be in the form of a straight strip that extends lengthwise. The shaving aid composite may have an arcuate shape, e.g., it may be in the form of a molded ring that surrounds the blades of an oval-shaped razor cartridge. Alternatively, the composite may be manufactured as an elongated strip and then positioned to surround the blades and clamped in place in an oval shape, e.g., as disclosed in U.S. Pat. No. 5,604,983, the full disclosure of which is incorporated herein by reference. The composite may be in other locations on the cartridge as desired.

The composite may also have any desired cross-sectional shape, for instance wedge-shaped, square or rectangular in cross-section. If the housing and composite do not include corresponding features for locking engagement, the composite may be glued to the housing or attached in any other desired manner, e.g., by insert molding.

As noted above, the shaving aid composite may be used on a wet shaving system that is a disposable shaving cartridge, or on a shaving head that is integral with a razor handle, e.g., on a disposable razor.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of manufacturing a shaving aid composite comprising:

spray coating a water-soluble shaving aid with mineral oil;

mixing the water-soluble shaving aid with a water-insoluble polymer; and forming the mixture into a solid shaving aid composite shaped to be retained by a receiving portion of a razor cartridge, wherein said step of coating is performed prior to said step of mixing, wherein the mineral oil is present in a concentration of about 2% to about 6% based on the total weight of the water soluble shaving aid, wherein all of the water-soluble shaving aid is coated with mineral oil, and wherein the water-soluble shaving aid consists of polyethylene oxide.

2. The method of claim 1 wherein the forming step comprises extrusion.

3. The method of claim 1 wherein the forming step comprises injection molding.

4. The method of claim 1 wherein the forming step comprises forming a base layer having a first composition and forming an upper portion, and a surface layer having a second composition, and wherein the step of forming the mixture into a solid shaving aid composite comprises placing the surface layer upon the upper portion of the base layer.

5. The method of claim 4 wherein the second composition has a relatively higher concentration of mineral oil than the second composition.

6. The method of claim 4 wherein the base layer and surface layer have different colors.

* * * * *